Sept. 2, 1969  R. P. STEIN ET AL  3,465,011
11-OXYGENATED-8-ISO STEROIDS
Filed Nov. 9, 1966
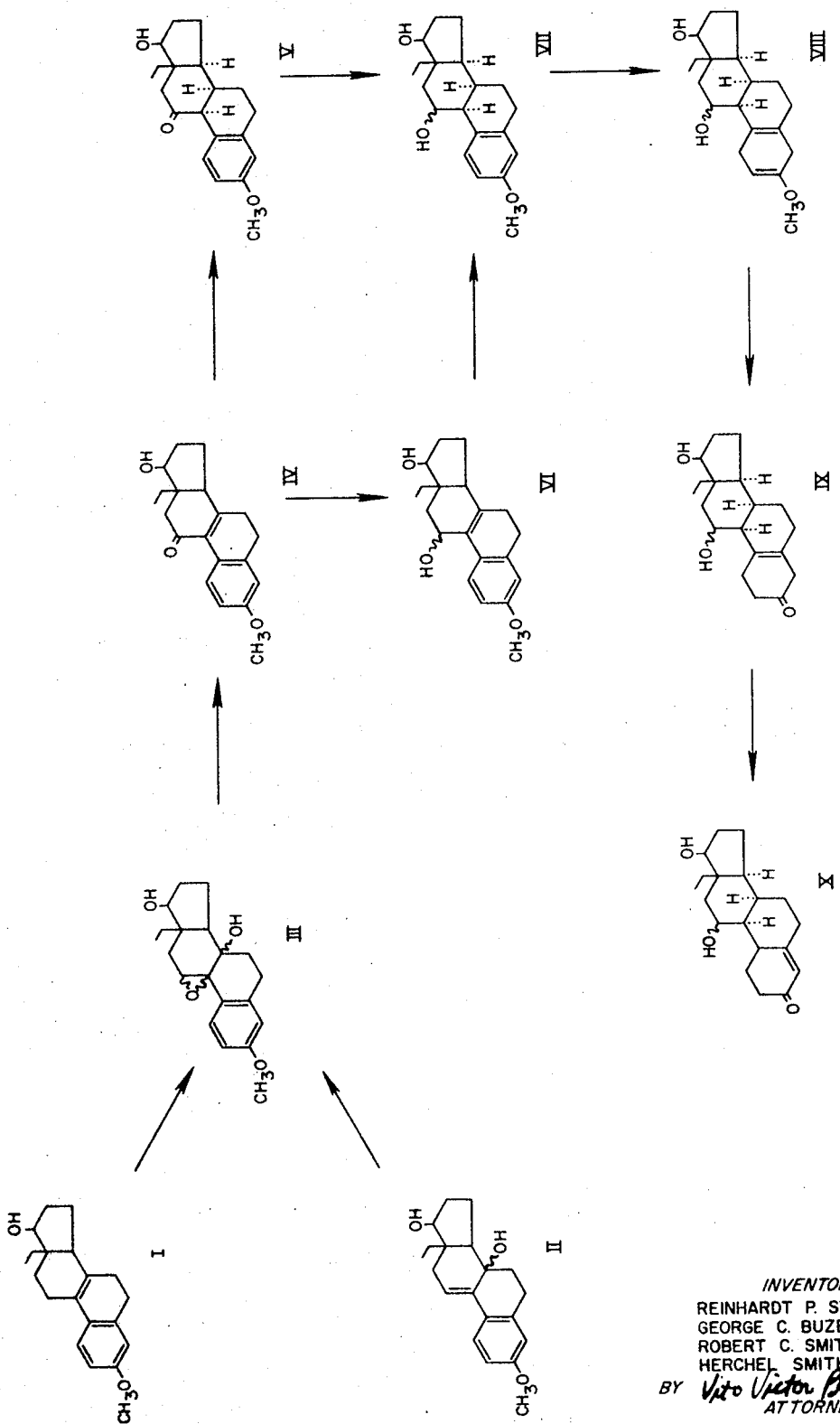
INVENTORS
REINHARDT P. STEIN
GEORGE C. BUZBY, JR.
ROBERT C. SMITH, JR.
HERCHEL SMITH
BY Vito Victor Bellino
ATTORNEY United States Patent Office 3,465,011
Patented Sept. 2, 1969

3,465,011
11-OXYGENATED-8-ISO STEROIDS
Reinhardt P. Stein, Conshohocken, George C. Buzby, Jr., Philadelphia, Robert C. Smith, Jr., King of Prussia, and Herchel Smith, Wayne, Pa., assignors to American Home Products Corporation, New York, N.Y., a corporation of Delaware
Filed Nov. 9, 1966, Ser. No. 593,059
Int. Cl. C07c *167/08, 169/08, 167/16*
U.S. Cl. 260—397.45     17 Claims

ABSTRACT OF THE DISCLOSURE

Treatment of 13-alkylgona-1,3,5(10),8-tetraenes or 13-alkylgona-1,3,5(10),9(11)-tetraen-8-ols with organic peracid results in the formation of corresponding 9,11-epoxy-13-alkylgona-1,3,5(10)-trien-8-ols. Treatment of the epoxides with acid affords gona-1,3,5(10),8-tetraen-11-ones, which on hydrogenation afford 8-isogona-1,3,5(10)-trien-11-ones. These products exert hormonal effects and are also useful as intermediates in the synthesis of other steroids having hormonal properties.

---

This invention relates to compositions of matter classified in the art of chemistry as 11-oxygenated substituted unsaturated 8-isogonane derivatives, to intermediates therefor, and to processes for making and using such compositions.

In describing the invention, reference will be made in the following specification to the annexed drawing wherein is illustrated schematically the reaction sequence for preparing a 13-alkyl-8-isogon-4-en-11-ol, specifically 13-ethyl-11,17-dihydroxy-8-isogon-4-en-3-one.

The invention sought to be patented in a principal composition aspect of the invention resides in the concept of an 11-oxygenated-3-polycarbon-alkyl-8-isogona-1,3,5-(10)-triene.

The tangible embodiments of the principal composition aspect of the invention possess the inherent general physical properties of being white crystalline solids, are substantially insoluble in water, and are generally soluble in such organic solvents as benzene, ethyl acetate, ethyl ether, and methanol. Examination of the compounds produced according to the hereinafter described process reveals, upon infrared, ultraviolet, and nuclear magnetic resonance spectrographic analysis, spectral data supporting the molecular structure hereinbefore set forth. For example, the 11-oxygenated function is evident in the infrared. The aforementioned physical characteristics taken together with the nature of the starting materials and the elemental analysis of the products obtained therefrom further confirm the molecular structure hereinbefore set forth.

The tangible embodiments of the principal composition aspect of the invention possess the applied use characteristic of being intermediates for making compositions which possess the inherent applied use characteristic of exerting qualitatively varying hormonal effects in animals as evidenced by pharmacological evaluation according to standard test procedures, particularly compounds having androgenic, anabolic and anti-inflammatory effects. Furthermore, the tangible embodiments of the principal composition aspect of the invention possess the inherent applied use characteristic of exerting qualitatively varying hormonal effects in animals as evidenced by pharmacological evaluation according to standard test procedures, specifically estrogenic and hypolipemic effects.

The invention sought to be patented in a second composition aspect of the invention resides in the concept of an 11-oxygenated-13-alkyl-8-isogona-2,5(10)-diene.

The tangible embodiments of the second composition aspect of the invention possess the inherent physical properties of being generally white crystalline solids, are substantially insoluble in water, and are generally soluble in such organic solvents as benzene, ethyl acetate, ethyl ether, and methanol. Examination of the compounds produced according to the hereinafter described process reveals, upon infrared, ultraviolet, and nuclear magnetic resonance spectrographic analysis, spectral data supporting the molecular structure hereinbefore set forth. For example, the 11-oxygenated function and the 2- and 5(10)-unsaturation are evident in the infrared. The aforementioned physical characteristics taken together with the nature of the starting materials and the elemental analysis of the products obtained therefrom further confirm the molecular structure hereinbefore set forth.

The tangible embodiments of the second composition aspect of the invention possess the applied use characteristic of being intermediates for making compositions which possess the inherent applied use characteristic of exerting qualitatively varying hormonal effects in animals as evidenced by pharmacological evaluation according to standard test procedures, particularly compounds having androgenic, anabolic and anti-inflammatory effects. Furthermore, the tangible embodiments of the second composition aspect of the invention possess the inherent applied use characteristic of exerting qualitatively varying hormonal effects in animals as evidenced by pharmacological evaluation according to standard test procedures.

The invention sought to be patented in a third composition aspect of the invention resides in the concept of an 11-oxygenated-13-alkyl-8-isogon-5(10)-ene.

The tangible embodiments of the third composition aspect of the invention possess the inherent physical properties of being generally white crystalline solids, are substantially insoluble in water, and are generally soluble in such organic solvents as benzene, ethyl acetate, ethyl ether, and methanol. Examination of the compounds produced according to the hereinafter described process reveals, upon infrared, ultraviolet, and nuclear magnetic resonance spectrographic analysis, spectral data supporting the molecular structure hereinbefore set forth. For example, the 11-oxygenated function is evident in infrared and the 5(10)-unsaturation in the proton nucleus magnetic resonance spectrum. The aforementioned physical characteristics taken together with the nature of the starting materials and the elemental analysis of the products obtained therefrom further confirm the molecular structure hereinbefore set forth.

The tangible embodiments of the third composition aspect of the invention possess the applied use characteristic of being intermediates for making compositions which possess the inherent applied use characteristic of exerting qualitatively varying hormonal effects in animals as evidenced by pharmacological evaluation according to standard test procedures, particularly compounds having androgenic, anabolic and anti-inflammatory effects. Furthermore, the tangible embodiments of the second composition aspect of the invention possess the inherent applied use characteristic of exerting qualitatively varying hormonal effects in animals as evidenced by pharmacological evaluation according to standard test procedures, particularly anabolic and androgenic effects.

The invention sought to be patented in a fourth composition aspect of the invention resides in the concept of an 11-oxygenated-13-alkyl-8-isogon-4-ene.

The tangible embodiments of the fourth composition aspect of the invention possess the inherent physical properties of being generally white crystalline solids, are substantially insoluble in water, and are generally soluble in such organic solvents as benzene, ethyl acetate, ethyl ether, and methanol. Examination of the compounds produced according to the hereinafter described process reveals, upon infrared, ultraviolet, and nuclear magnetic resonance spectrographic analysis, spectral data supporting the molecular structure hereinbefore set forth. For example, the 11-oxygenated function and the 4(5)-unsaturation are evident in the infrared, and, in the case of a 3-one, the conjugated ketone is evident in the ultraviolet. The aforementioned physical characteristics taken together with the nature of the starting materials and the elemental analysis of the products obtained therefrom further confirm the molecular structure hereinbefore set forth.

The tangible embodiments of the fourth composition aspect of the invention possess the inherent applied use characteristic of exerting qualitatively varying hormonal effects in animals as evidenced by pharmacological evaluation according to standard test procedures, particularly anabolic, androgenic, and anti-inflammatory effects. Furthermore, the tangible embodiments of the fourth composition aspect of the invention possess the applied use characteristic of being intermediates for making other compositions which possess the inherent applied use characteristic of exerting qualitatively varying hormonal effects in animals as evidenced by pharmacological evaluation according to standard test procedures, particularly compounds having anabolic, androgenic, and anti-inflammatory effects.

The invention sought to be patented in a principal process aspect resides in the concept of a sequence of reactions including:

(a) Converting a 13-alkylgona-1,3,5(10),8-tetraene or a 13-alkylgona-1,3,5(10),9(11)-tetraen-8-ol to the corresponding 9,11 - epoxy-13-alkylgona-1,3,5(10)-trien-8-ol, (b) Opening the epoxide ring and dehydrating to form a gona-1,3,5(10),8-tetraen-11-one, and (c) Hydrogenating the 8(9)-double bond to form an 8-isogona-1,3,5(10)-trien-11-one.

The invention sought to be patented in a second process aspect resides in the concept of a sequence of reactions including:

(a) Converting a 13-alkylgona-1,3,5(10),8-tetraene or a 13-alkylgona-1,3,5(10),9(11)-tetraen-8-ol to the corresponding 9,11-epoxy-13-alkylgona-1,3,5(10)-trien-8-ol, (b) Opening the epoxide ring and dehydrating to form a gona-1,3,5(10),8-tetraen-11-one, (c) Selectively reducing the 11-ketone function to form a gona-1,3,5(10),8-tetraen-11-ol, and (d) Hydrogenating the 8(9)-double bond to form an 8-isogona-1,3,5(10)-trien-11-ol.

The invention sought to be patented in a third process aspect resides in the concept of hydrogenating the 8(9)-double bond of a gona-1,3,5(10),8-tetraen-11-one to form an 8-isogona-1,3,5(10)-trien-11-one.

The manner of making and using the invention will now be generally described so as to enable a person skilled in the art of chemistry to make and use the same as follows:

Referring now to the figure wherein the compounds are assigned Roman numerals for identification, the starting materials for the process of the invention, i.e., the 13-alkyl-gona-1,3,5(10),8-tetraenes (I) or the 13-alkylgona-1,3,5(10), 9(11)-tetraen-8-ols (II) are prepared as described in British patents Ser. No. 991,594 and Ser. No. 1,024,911 (I), and U.S. application Ser. No. 559,175, filed June 21, 1966 (II), or from compounds whose preparation from the compounds described in the cited specifications would be obvious to one skilled in the art of organic chemistry. If the starting material selected is a 13-alkylgona-1,3,5(10),8-tetraene (I), it is treated with at least two molar equivalents of an organic peracid, such as, for example, m-chloroperbenzoic acid, in a solvent of moderate polarity, such as benzene, chloroform or methylene chloride, preferably at about room temperature or above, to prepare the corresponding 9,11-epoxy-13-alkylgona-1,3,5(10)-trien-8-ol (III). If the selected starting material is a 13-alkylgona-1,3,5(10), 9(11)-tetraen-8-ol, it is treated with at least one molar equivalent of peracid under similar conditions to give III. Treating the 9,11-epoxide under acidic conditions, preferably with hydrochloric acid in methanol, preferably below the boiling point, gives by rearrangement and dehydration the corresponding 13-alkylgona-1,3,5(10),8-tetraen-11-one (IV). This compound is then catalytically hydrogenated, for example, with hydrogen and palladium in ethanol, to give the corresponding 13-alkyl-8-isogona-1,3,5(10)-trien-11-one (V). The 11-ketone function may then be reduced, for example, with lithium borohydride, to afford the corresponding 13-alkyl-8-isogona-1,3,5(10)-trien-11-ol (VII). Alternatively, the gonatetraen-11-one may first be reduced, for example, with lithium borohydride, to give the corresponding tetraen-11-ol (VI), which is then catalytically hydrogenated to the corresponding 13-alkyl-8-isogona-1,3,5(10)-trien-11-ol (VII). Compound VII is converted to the corresponding 13-alkyl-8-isogona-2,5(10)-dien-11-ol (VIII) by means of alkali metal reduction in liquid ammonia in the presence of a proton donor, such as ethanol (Birch reduction). By acid hydrolysis with a weak acid, such as oxalic acid, the diene (VIII) is converted to the corresponding 13-alkyl-8-isogon-5(10)-en-11-ol (IX); treatment of IX with mineral acid affords the corresponding 13-alkyl-8-isogon-4-en-11-ol (X). As variations of the foregoing, the 1,3,5(10)-trien-11-one (V) may be converted directly to the 2,5(10)-dien-11-ol (VIII) by Birch reduction; treatment of VIII with mineral acid will effect both hydrolysis and rearrangement to afford the gon-4-ene compound (X).

While the processes have been specifically described by reference to the drawing which illustrates the application of the process of our invention to compounds having a methoxy group in the 3-position, it will be apparent to those skilled in the art of organic chemistry that the processes are also applicable where other groups are present in that position. Thus, in the practice of the first reaction step of the first and second process aspects of the invention, namely the conversion of a 1,3,5(10),8-tetraene or a 1,3,5(10),9(11)-tetraen-8-ol to a 9,11-epoxy-1,3,5(10)-trien-8-ol, any group may be present at the 3-position so long as it is unaffected by the process of the reaction, or, if affected, will give a desired reaction product. For the practice of the second reaction step, namely the opening of the 9,11-epoxy function, there is the limitation that the substituent at the 3-position should not be ring-deactivating in electrophilic aromatic substitution. Thus, for example, the 3-position may contain such functions as alkoxy, hydroxy, hydrogen, or acyloxy, but not e.g., trimethylammonium, nitro, etc.

Similarly, while the processes have been specifically described by rerefernce to the drawing which illustrates the application of the process of our invention to a compound having a 17-hydroxy group, it will be apparent to those skilled in the art of organic chemistry that other groups may be substituted in that position. Thus, in lieu of an hydroxy group, the 17-carbon may bear any substituent which is unaffected by the reactions of the invention, or, if affected, will give a desired reaction product. Thus, for example, in lieu of an hydroxy group the 17-position may bear such substituents as an oxo group, an acyloxy group, an hydroxy and an ethynyl group, or a ketal group. Furthermore, where a 17-carbonyl is present in any of the intermediate or product aspects of the invention, it may be converted to an e.g., alkyl hydroxymethylene, alkynyl hydroxymethylene, or hydroxymethylene group, and may be ketalized or thioketalized, all by methods known to those skilled in the art. It will be readily apparent that a 17-carbonyl will be simultaneously reduced upon borohydride reduction of the 11-carbonyl in the production of the 11-hydroxy-8-iso-1,3,5(10)-triene compounds of this invention. If a 17-carbonyl product is desired, it will therefore be necessary to protect this position by one of the known methods.

Further, it will be readily apparent that in any of the composition aspects of the invention, the 11-oxygenated function may be either keto or hydroxymethylene (or their functional) derivatives. Thus, for example, while the reaction conditions necessary to produce a particular embodiment of a composition aspect of the invention might be such that a keto group present in the precurser compound would be reduced, a desired composition containing such keto groups may be obtained either by protecting the keto group of the precursor, or by re-oxidizing a resulting 11-hydroxymethylene group, all by means known in the art.

The hereinbefore described processes give rise to compounds which, in addition to their previously described inherent hormonal activity, are intermediates for synthetic routes to other steroids having hormonal activity, particularly the important class of 8-iso-corticosteroids. Thus, for example, by known methods, 3-methoxy-13-methyl-8-isogona-1,3,5(10)-trien-11,17-dione may be converted to 8-iso-corticosterone. The compounds produced by the processes of this invention are also useful as intermediates in the production of other compounds having hormonal activity, such as 11-hydroxy-8-iso-testosterone and 11-hydroxy-8-iso-estrone.

The processes (and the compounds produced by them) provide a novel, unique and feasible route to compounds difficult to obtain from natpral steroids, namely, where the group in the 13-position is polycarbon alkyl. The 13- polycarbon-alkyl group can be of varying chain length, such as, for example, ethyl, propyl, isopropyl, butyl, isobutyl, pentyl, etc., and even cetyl, and for the processes of the invention when such groups are present in the starting material they will correspondingly be present in the intermediates and the final product, and as intermediates and in the processes of the invention, are the full equivalents of the compounds particularly described and claimed.

It will be apparent to those skilled in the art of chemistry that the starting compounds can bear substituents at positions of the steroid nucleus other than those previously mentioned. Thus, for example, the nucleus may bear such substituents as 6- or 7-methyl or ethyl, or 16-hydroxy. Such variations in the compositions and processes of this invention are the full equivalents of the compositions and processes as particularly described.

It will also be apparent to those skilled in the art that where in the composition aspect of the invention there is a hydroxy group present this group can be esterfied with a carboxylic acid, such as, for example, acetic, propionic, butyric, decanoic, benzoic, etc. either directly or by means of derivatives such as their anhydrides or halides, to form esters and such esters are full equivalents of the compounds of the corresponding intermediates and products in their applied use characteristic of exerting qualitatively varying hormonal effects differing in degree of activity rather than kind. Similarly, the corresponding inorganic acid esters such as, for example, the 17-sulfate and the 17-phosphate can be prepared and are the full equivalents of the composition aspect of the invention in the applied use charatceristic of exerting hormonal effects.

While the tetracyclic compounds in the specification and the appended examples are usually named to describe the absolute configuration corresponding to that of the natural steroid, it is to be understood that the configuration is unaffected by the processes of the reaction, so that if the starting material is a racemic mixture, the product will also be a racemic mixture, and if the starting material is a particular enantimorphic configuration, then the product will be of the same enantimorphic series.

The following examples illustrate the best mode contemplated by the inventors of carrying out the processes of the invention, and the manner of using as intermediates the compositions of the invention.

Example 1.—($\pm$)-9,11-epoxy-8-hydroxy-3-methoxy-13-methylgona-1,3,5(10)-trien-17-one Dissolve ($\pm$) - 3-methoxy-13-methylgona-1,3,5(10),8-tetraen-11-one (5.00 g.) in chloroform (200 ml.) and add m-chloroperbenzoic acid (7.63 g.) to the solution (slight warming). Stir the reaction at room temperature for 3 hours. Remove the chloroform in vacuo. Dissolve the residue in ethyl acetate and wash the extract well with 5% potassium hydroxide solution with water and with saturated sodium chloride solution, then dry the extract over anhydrous sodium sulfate. Filter and remove the solvent in vacuo. Dissolve the resulting oil in benzene and stand to let crystallize. Filter the white crystalline solid to get the title product (2.17 g.); M.P. 164–166° and second crops (1.27 g.); M.P. 153–158°. Purify the first crop material by dissolving in methylene chloride, treating with Nuchar charcoal and filtering through Super Cel. Replace the methylene chloride with ethyl acetate by boiling in the steam bath, then allow to cool and crystallize. Filter the resulting white needles of solvated title product (1.84 g.); M.P. 153–155°;

$$\lambda_{max.}^{KBr} \ 2.95 \text{ and } 5.80\mu$$

The analytical sample (from ether) has M.P. 156–160°; Calcd for $C_{19}H_{22}O_4$: C, 72.59; H, 7.05%. Found: C, 72.37;

H, 6.95% and $\lambda_{max.}^{EtOH}$ 235 m$\mu$ ($\epsilon$ 12,800)

Example 2.—($\pm$)-9,11-epoxy-8-hydroxy-3-methoxy-13-methylgona-1,3,5(10)-trien-17-one Stir ($\pm$) - 8 - hydroxy-3-methoxy-13-methylgona-1,3,5-(10),9(11)-tetraen-17-one (1.25 g.) in benzene (50 ml.) and add m-chloroperbenzoic acid (0.95 g.) to the mixture. Stir at room temperature for 2 hours. Dilute the reaction with ethyl acetate and wash the extract well wih 5% sodium hydroxide solution, with water and with saturated sodium chloride solution, then dry over anhydrous sodium sulfate. Filter and remove the solvents in vacuo. Dissolve the oil in warm ether, then stand to let crystallize. Filter the white needles to obtain the title product (0.92 g.); M.P. 149–155°;

$$\lambda_{max.}^{KBr} \ 2.95 \text{ and } 5.78\mu; \ \lambda_{max.}^{EtOH} \ 232 \text{ m}\mu \ (\epsilon \ 11,800)$$

Example 3.—($\pm$)-9,11-epoxy-3-methoxy-3-methylgona-1,3,5(10)-trien-8,17$\beta$-diol Mix ($\pm$) - 9,11-epoxy-8-hydroxy-3-methoxy13-methylgona-1,3,5(10)-trien-17-one (2.00 g.) and methanol (100 ml.), then add sodium borohydride (a total of 2.0 g.) in small portions to the stirred mixture over a period of 1 hour. After complete addition, stir for 1.5 hours more at room temperature. Add water (400 ml.), then extract the mixture with ethyl acetate. Wash the extract with water and saturated sodium chloride solution, then dry over anhydrous sodium sulfate. Filter and remove the solvent in vacuo. Dissolve the yellow oil in methylene chloride, treat with Nuchar charcoal and filter through Super Cel. Remove the methylene chloride in vacuo, triturate the oil with ether and let stand to crystallize. Filter to get 1.34 g. of the title product as a white crystalline solid; M.P. 176–178°;

$$\lambda_{max.}^{KBr} \ 3.02\mu; \ \lambda_{max.}^{EtOH} \ 235 \text{ m}\mu \ (\epsilon \ 12,900)$$

Example 4.—($\pm$)-9,11-epoxy-3-methoxy-13-methylgono-1,3,5-(10)-triene-8,17$\beta$-diol Dissolve ($\pm$) - 3-methoxy-13-methylgona-1,3,5(10),8-tetraen-17$\beta$-ol (50 g.) in benzene (500 ml.) and tetrahydrofuran (100 ml.) and carefully add this dropwise to a stirred mixture of m-chloroperbenzoic acid (75 g.) and benzene (400 ml.) over a period of two hours. (Use an ice bath to maintain the temperature at 25–30° C.) After complete addition, continue stirring the reaction at room temperature for 3 hours. Quench the reaction by adding 5% potassium carbonate solution (1 liter), then stir at room temperature a few more minutes. Separate the layers, dilute the extract with ethyl acetate and wash the extract with 5% sodium hydroxide solution, with water and with saturated sodium chloride solution, then dry the solution over anhydrous sodium sulfate. Filter and remove the solvents in vacuo. The resulting yellow oil contains the title product ($\lambda_{max.}^{EtOH}$ 232 m$\mu$)

Example 5.—($\pm$) - 17$\beta$-hydroxy - 3-methoxy-13-methylgona-1,3,5(10),8-tetraen-11-one Dissolve the oil from Example 4 in methanol (200 ml.) boiling the mixture to fully dissolve the oil. Remove the heat and add 18% hydrochloric acid (10 ml.) to the solution. Stir the reaction at room temperature, then cool with an ice-bath. Dilute the reaction with water (250 ml.) and ethyl acetate, and filter the mixture to obtain 8.7 g. of the title product; M.P. 200–204°. Further purify a sample (1.00 g.) by treating a boiling tetrahydrofuran solution with Nuchar charcoal, then filter the hot mixture through Super Cel. Replace the solvent with ethanol by boiling in the steam bath and allow the solution to stand to deposit 0.78 g. of pure title product as tiny prisms; M.P. 210–213°;

$\lambda_{max.}^{KBr}$ 2.98 and 6.13$\mu$; $\lambda_{max.}^{EtOH}$ 247 m$\mu$ ($\epsilon$ 17,300)

Calcd. for $C_{19}H_{22}O_3$: C, 76.48; H, 7.43%. Found: C, 76.64; H, 7.38%.

Example 6.—($\pm$) - 17$\beta$ - hydroxy-3-methoxy-13-methylgona-1,3,5(10),8-tetraen-11-one Add a solution of ($\pm$)-3-methoxy-13-methylgona-1,3,5(10),9(11) - tetraene - 8,17$\beta$ - diol (50.0 g.) in tetrahydrofuran (500 ml.) dropwise to a stirred mixture of m-chloroperbenzoic acid (37.1 g.) and benzene (250 ml.). (Use an ice-bath to keep the temperature of the solution below 25° C.) After complete addition, stir the reaction at room temperature for 1.5 hours. Then dilute the reaction mixture with ethyl acetate. Wash the extract with 10% sodium carbonate solution, water and saturated sodium chloride solution, then dry over anhydrous sodium sulfate. Filter and remove the solvent in vacuo to an oil which contains ($\pm$)-9, 11-epoxy-3-methoxy-13-methylgona-1,3,5(10)-triene-8,17$\beta$-diol. Dissolve the oil in methanol (250 ml.), then add 4 N hydrochloric acid (100 ml.) and stir at room temperature for a few minutes. Filter the mixture to obtain 35.5 g. of the title product; M.P. 198–201°;

$\lambda_{max.}^{KBr}$ 3.0 and 613$\mu$; $\lambda_{max.}^{EtOH}$ 246 m$\mu$ ($\epsilon$ 16,470)

Example 7.—($\pm$) - 9,11-epoxy-8-hydroxy-3-methoxy-13-ethylgona-1,3,5(10)-trien-17-one Dissolve ($\pm$) - 3 - methoxy-13-ethylgona-1,3,5(10),8-tetraen-17-one (5.00 g.) in chloroform (150 ml.), then add m-chloroperbenzoic acid (6.67 g.) carefully to the stirred solution. (Warming is evident as the peracid is being added.) Continue stirring the reaction at room temperature for 2 hours. Remove the solvent in vacuo and triturate the solid with ether and filter to give the title product (1.76 g.) as a white crystalline solid; M.P. 160–165°. Allow the filtrate from above to stand to deposit a further 1.43 g. of title product; M.P. 138–145°. Dilute the latter filtrate with ether and wash the extract well with 5% sodium hydroxide solution, with water and with saturated sodium chloride solution and dry over anhydrous sodium sulfate. Filter and remove the solvent in vacuo. Cover the residue with ether and let stand to fully crystallize. Filter the white crystalline solid to obtain a further 2.19 g. of title product; M.P. 145–150°. Combine the above three crops and dissolve them in methylene chloride. Treat the solution with Nuchar charcoal, warm, then let cool and filter the mixture through Super Cel. Replace the methylene chloride with ethyl acetate by boiling on the steam bath and let cool to crystallize. Filter the white crystalline solid to give 2.55 g. of the pure title product; M.P. 192–196°:

$\lambda_{max.}^{KBr}$ 2.88 and 5.77$\mu$; $\lambda_{max.}^{EtOH}$ 234 m$\mu$ ($\epsilon$ 12,600)

Calcd. for $C_{20}H_{24}O_4$: C, 73.14; H, 7.37. Found: C, 72.84; H, 7.17.

Example 8.—($\pm$) - 9,11-epoxy-8-hydroxy-3-methoxy-13-etlhylgona-1,3,5(10)-trien-17-one Dissolve ($\pm$)-8-hydroxy-3-methoxy-13-ethylgona-1,3,5(10),9(11)-tetraen-17-one (1.3 g.) and m-chloroperbenzoic acid (0.91 g.) in benzene (100 ml.) and stir at room temperature for 19 hours. Dilute the solution with benzene (300 ml.) and wash the extract with 10% sodium hydroxide solution, with water and with saturated sodium chloride solution, then filter and remove the solvent in vacuo to give an oil. Dissolve the oil in ethyl acetate and let crystallize. Filter the white crystalline solid to give 0.64 g. of the title product; M.P. 188–200°;

$\lambda_{max.}^{KBr}$ 2.92 and 5.79$\mu$

Example 9.—($\pm$)-9,11 - epoxy - 3-methoxy-13-ethylgona-1,3,5(10)-triene-8,17$\beta$-diol Stir ($\pm$) - 9,11 - epoxy-8-hydroxy-3-methoxy-13-ethylgona-1,3,5(10)-trien-17-one (0.50 g.) with methanol (20 ml.) and add sodium borohydride (total of 0.75 g.) portionwise to the stirred mixture over a period of 1 hour. After complete addition, stir the reaction for 1 hour more, then dilute the solution with water. Extract the mixture with ether and wash the extract with water and with saturated sodium chloride solution, then dry over anhydrous sodium sulfate. Filter and remove the ether in vacuo to get a clear oil. Triturate the oil with petroleum ether to give the title product (0.27 g.) as a white solid; M.P. 151–154°;

$\lambda_{max.}^{KBr}$ 297$\mu$ (broad OH); $\lambda_{max.}^{EtOH}$ 234 m$\mu$ ($\epsilon$ 12,500)

Calcd. for $C_{20}H_{26}O_4$: C, 72.70; H, 7.93. Found: C, 72.78; H, 7.72.

Example 10.—($\pm$) - 9,11-epoxy-3-methoxy-13-ethylgona-1,3,5(10),8-tetraen-11-one Dissolve ($\pm$) - 3-methoxy - 13-ethylgona-1,3,5(10),8-tetraen-17$\beta$-ol (10.00 g.) in benzene (200 ml.) and carefully add m-chloroperbenzoic acid (16.0 g.) in small portions to the stirred solution (strong warming is evident upon addition of the peracid). Stir the reaction for 2 hours at room temperature. Add ether (100 ml.) to dissolve the precipitated m-chlorobenzoic acid, then continue stirring for 2 hours more. Quench the reaction by the addition of 5% potassium carbonate solution (300 ml.), separate the layers and dilute the organic layer with ethyl acetate. Wash the extract with 5% sodium hydroxide solution, water and saturated sodium chloride solution, then dry over anhydrous sodium sulfate. Filter and remove the solvents in vacuo to give an orange oil containing the title product. The product is not further purified but further treated with hydrochloric acid as described in Example 11.

Example 11.—($\pm$) - 17$\beta$ - hydroxy-3-methoxy-13-ethylgona-1,3,5(10),8-tetraen-11-one Dissolve the oil from Example 10 in methanol (100 ml.) and add to it 18% hydrochloric acid (10 ml.). Stir the solution at room temperature for 2 hours. Filter the solid to obtain the title product.

Example 12.—($\pm$)-17$\beta$-hydroxy-3-methoxy-13-ethylgona-1,3,5(10),8-tetraen-11-one Add a solution of ($\pm$)-3-methoxy-13-ethylgona-1,3,5(10),9(11)tetraene8,17$\beta$-diol (35.0 g.) in tetrahydrofuran (400 ml.) dropwise to a stirred mixture of m-chloroperbenzoic acid (24.8 g.) and benzene (400 ml.). (Use an ice-bath to keep the temperature of the reaction at 15–20°). After complete addition, stir the reaction at room temperature for 2.5 hours. Dilute the mixture with ethyl acetate and wash the extract with 10% sodium bicarbonate solution, with water and with saturated sodium chloride solution, then dry over anhydrous sodium sulcrystallize. Filter the resulting colorless prisms to obtain 0.28 g. of the pure title product; M.P. 155–156°;

$$\lambda_{max.}^{KBr} \text{ 2.86 and 2.99} \mu$$

Example 21.—(±)-3-methoxy-13-methyl-8-isogona-1,3,5(10)-triene-11,17β-diol

Dissolve (±) - 17 - hydroxy-3-methoxy-13-methylgona-1,3,5(10),8-tetraen-11-one (1.0 g.) in tetrahydrofuran (70 ml.) and add the solution to a pre-hydrogenated mixture of platinum oxide (0.60 g.) and tetrahydrofuran (50 ml.). Allow the mixture to take up two equivalents of hydrogen, then filter through Super Cel. Remove the solvent in vacuo. Triturate the oil with ether to obtain a crystalline solid. The solid shows about 25–30% of saturated carbonyl in the infrared spectrum (5.85μ). Dissolve the product in ethanol (60 ml.) and add this to a pre-hydrogenated mixture of platinum oxide (0.50 g.) and ethanol (50 ml.). Allow the mixture to react with hydrogen until uptake of the gas ceases. Filter through Super Cel and remove the solvent in vacuo. Triturate the oil with ether and filter the white crystalline solid. Recrystallize from ether to obtain 325 mg. of the pure title product; M.P. 153–155°;

$$\lambda_{max.}^{KBr} \text{ 2.85 and 2.98} \mu$$

Calc'd for $C_{19}H_{26}O_3$: C, 75.46; H, 8.67. Found: C, 75.14; H, 8.64.

Example 22.—(±)-3-methoxy-13-methyl-8-isogona-2,5(10)-diene-11,17β-diol

Add (±) - 3 - methoxy-13-methyl-8-isogona-1,3,5(10)-triene-11,17βdiol (9.3 g.) in dry THF (100 ml.) to liquid ammonia (1300 ml.) containing THF (500 ml.). Add two gram atoms of lithium metal (0.426 g.) and isolate the crude product after the solution becomes colorless. Examination of the crude product will indicate incomplete reaction. Retreat the crude product as above with lithium metal (0.250 g.) and discharge the blue color by dropwise addition of ethanol. Add water and extract with ether. Wash the ether layer until the washings are neutral. Remove the solvent and triturate the crude total product with methanol. Filter off the by-product (±)-3-methoxy-13-methyl-8-isogen-2-en-11,17β-diol (1.05 g.) (M.P. 215–223° C.);

$$\lambda_{max.}^{KBr} \text{ 2.95, 5.96} \mu$$

Concentrate the mother liquors and isolate the title compound (4.60 g.) (M.P. 152–155° C.);

$$\lambda_{max.}^{KBr} \text{ 2.85, 3.05, 5.90, 6.0} \mu$$

Example 23.—(±)-3-methoxy-13-methyl-8-isogona-2,5(10)-diene-11,17β-diol, 17-acetate Treat (±) - 3 - methoxy-13-methyl-8-isogona-2,5(10)-diene-11,17β-diol (1.25 g.) in pyridine (30 ml.) with acetic anhydride (5.0 ml.) and allow the clear solution to stand overnight. Pour into water, extract with ether-ethyl acetate and wash the ether layer with aqueous sodium bicarbonate and water. Dry and evaporate the solvent. Triturate the product with ether-petroleum ether to obtain the title compound (0.600 g.) M.P. 158–165° C.;

$$\lambda_{max.}^{KBr} \text{ 2.85, 5.76, 5.90, 6.0} \mu$$

Example 24.—(±)-11,17β-dihydroxy 13-methyl-8-isogona-5(10)-en-3-one

Dissolve (±)-3-methoxy-13-methyl-8-isogona-2,5(10)-diene-11,17β-diol (1.0 g.) in methanol (50 ml.) and add oxalic acid monohydrate (0.350 g.) in water (5.0 ml.). Stir under nitrogen for one hour, and add water dropwise. Filter and dry the title compound (0.750 g.) (M.P. 167–168° C.)

$$\lambda_{max.}^{KBr} \text{ 2.97, 5.90} \mu$$

Example 25.—(±)-11,17β-dihydroxy-13-methyl-8-isogona-5(10)-en-3-one, 17-acetate

Dissolve (±)-11,17β-dihydroxy - 13 - methyl-8-isogon-5(10)-en-3-one (0.480 g.) in pyridine (3.0 ml.) and add acetic anhydride (1.0 ml.) and allow to stand overnight. Pour into water and extract with ether. Wash, dry and evaporate. Triturate the product with ether-petroleum ether to obtain the title compound (0.150 g.) (M.P. 154–157°C.).

$$\lambda_{max.}^{KBr} \text{ 2.89, 5.78, 5.87} \mu$$

Example 26.—(±)-17β-hydroxy-3-methoxy-13-ethyl-8-isogona-1,3,5(10)-trien-11-one

Dissolve (±)-17β-hydroxy-3-methoxy - 13 - ethylgona-1,3,5(10),8-tetraen-11-one (2.0 g.) in tetrahydrofuran (75 ml.) and dilute with ethanol (350 ml.). Add the solution to a pre-hydrogenated mixture of 5% palladium on carbon (0.55 g.) and ethanol (50 ml.) and treat the mixture with hydrogen until uptake of the gas is complete. Filter the mixture through Super Cel and remove the solvents in vacuo. Triturate the resulting oil and filter the white solid to obtain 1.07 g.; M.P. 153–158°. Further purify a sample by recrystallization from ethyl acetate to give the pure title product; M.P. 174–177°;

$$\lambda_{max.}^{KBr} \text{ 2.87 and 5.88} \mu$$

Example 27.—(±)-3-methoxy-13-ethyl-8-isogona-1,3,5(10)-triene-11,17-dione

Dissolve (±)-3-methoxy-13-ethylgona-1,3,5(10),8-tetraene-11,17-dione (1.50 g.) in terahydrofuran (100 ml.), then dilute with ethanol (150 ml.) and add the solution to a pre-hydrogenated mixture of 5% palladium on carbon (0.75 g.) and ethanol (50 ml.). Allow the solution to react with hydrogen until uptake of the gas is complete. Filter the mixture through Super Cel and remove the solvents in vacuo. Dissolve the residue in methylene chloride, treat with Nuchar charcoal and filter through Super Cel. Remove the solvent in vacuo and triturate the oil with methanol. Filter the resulting colorless prisms to obtain as a methanol solvate, 0.77 g. of the title product; M.P. 136–138°;

$$\lambda_{max.}^{KBr} \text{ 295 } (CH_3OH), \text{ 5.78 and 5.86} \mu$$

Purify the sample further by dissolving in methylene chloride, treating with Nuchar charcoal and filtering through Super Cel. Replace the solvent with ethanol by boiling on the steam bath, then let the solution cool and crystallize. Fiter and dry the resulting colorless prisms to obtain 0.06 g. of the pure title product; M.P. 149–152°;

$$\lambda_{max.}^{KBr} \text{ 5.77 and 5.85} \mu$$

Calc'd for $C_{20}H_{24}O_3$: C, 76.89; H, 7.74%. Found: C, 76.87; H, 7.59%.

Example 28.—(±)-3-methoxy-13-ethyl-8-isogona-1,3,5(10)-triene-11,17β-diol

Stir (±)-17β-hydroxy-3-methoxy-13-ethyl-8-isogona-1,3,5(10)-trien-11-one (0.11 g.) in methanol (20 ml.) and add sodium borohydride (a total of 0.11 g.) in small portions to the stirred solution. After complete addition, stir the reaction for 1.5 hours more. Add water (100 ml.) and extract with ethyl acetate. Wash, dry and evaporate the extract and triturate the product with ether-hexane to obtain 0.035 g. of the title compound; M.P. 139–141°;

$$\lambda_{max.}^{KBr} \text{ 2.85 and 2.96} \mu$$

Calc'd for $C_{20}H_{28}O_3$: C, 75.91; H, 8.92%. Found: C, 75.73; H, 9.08%.

Example 29.—(±)-3-methoxy-13-ethyl-8-isogona-1,3,5(10)-triene-11,17β-diol

Stir (±) - 3-methoxy-13-ethyl-8-isogona-1,3,5(10)-triene-11,17-dione (2.5 g.) and methanol (100 ml.) and add sodium borohydride (a total of 2.5 g.) to the stirred reaction. After complete addition, stir the reaction for one more hour, then add water dropwise to precipitate the title product.

fate. Filter and remove the solvents in vacuo to an oil (39.5 g.) which contains ($\pm$)−9, 11−epoxy−3−methoxy−13−ethylgona−1$_x$ 3, (10)−triene−8, 17$\beta$−diol ($\lambda_{max.}^{EtOH}$ 235 m$\mu$)

Dissolve the oil in methanol (150 ml.) and at room temperature add 3 N hydrochloric acid (75 ml.) to the solution. Stir at room temperature a few minutes, then filter to obtain 25.1 g. of the title product; M.P. 179–185°. Recrystallize a sample from ethyl acetate-acetone to obtain the pure title product; M.P. 184–190°;

$\lambda_{max.}^{KBr}$ 297 and 6.13$\mu$; $\lambda_{max.}^{EtOH}$ 247 m$\mu$ ($\epsilon$ 17,000)

Example 13.—($\pm$)-13-methyl-3-methoxygona-1,3,5(10), 8-tetraene-11,17-dione

Dissolve ($\pm$) - 9,11 - epoxy-8-hydroxy-3-methoxy-13-methylgona-1,3,5(10)-trien-17-one (1.00 g.) in tetrahydrofuran (15 ml.) then dilute with methanol (35 ml.). Add 18% hydrochloric acid (2 ml.) and stir at room temperature for 45 minutes. Dilute with water (150 ml.) and filter the resulting crystalline precipitate. Dissolve the solid in methylene chloride, treat with Nuchar charcoal and filter through Super Cel. Replace the solvent with ethanol by boiling on the steam bath, then let cool to fully crystallize. Filter to give 0.30 g. of the title product; M.P. 150–154°;

$\lambda_{max.}^{KBr}$ 5.75 and 6.04$\mu$; $\lambda_{max.}^{EtOH}$ 247 m$\mu$ ($\epsilon$ 16,600)

Example 14.—($\pm$)-13-ethyl-3-methoxygona-1,3,5(10),8-tetraene-11,17-dione

Dissolve ($\pm$) - 9,11 - epoxy-8-hydroxy-3-methoxy-13-ethylgona-1,3,5(10)-trien-17-one (2.00 g.) in tetrahydrofuran (25 ml.), then dilute with methanol (50 ml.). Add 18% hydrochloric acid (5 ml.) and stir at room temperature for one hour. Dilute with water (250 ml.), filter and dry to obtain the title product.

Example 15.—($\pm$)-3-methoxy-13-methylgona-1,3,5(10), 8-tetraene-11,17-dione

Dissolve ($\pm$)-17$\beta$-hydroxy-3-methoxy-13-methylgona-1,3,5(10),8-tetraen-11-one (1.00 g.) in dimethylsulfoxide (45 ml.) and acetic anhydride (5 ml.) and allow the solution to stand at room temperature overnight. Pour the reaction into water. Add ether, then blow off the ether with a stream of nitrogen. Scratch the flask with a glass rod to induce crystallization. Filter the blue precipitate and wash with water, then air-dry. Dissolve the solid in methylene chloride, treat with Norit A charcoal and filter through Super Cel. Replace the solvent with ethanol by boiling on the steam bath. Let the solution cool to crystallize. Filter to obtain 0.51 g. of the title product; M.P. 157–160°;

$\lambda_{max.}^{KBr}$ 5.75 and 6.06$\mu$; $\lambda_{max.}^{EtOH}$ 246 m$\mu$ ($\epsilon$ 16,500)

Example 16.—($\pm$)-3-methoxy-13-ethylgona-1,3,5(10),8-tetraene-11,17-dione

Dissolve ($\pm$)-17$\beta$-hydroxy - 3 - methoxy-13-ethylgona-1,3,5(10),8-tetraen-11-one (1.00 g.) in dimethylsulfoxide (30 ml.) and acetic anhydride (5 ml.) and allow the solution to stand overnight. Pour the reaction into water, add some ether and blow it off with nitrogen, scratching the flask to induce crystallization. Filter and air dry the resulting crystalline precipitate. Dissolve the solid in methylene chloride, treat with Norit A charcoal and filter through Super Cel. Replace the methylene chloride with ethanol by boiling on the steam bath, then allow the solution to stand to complete crystallization. Filter the resulting crystalline solid to obtain 0.82 g. of the title product; M.P. 180–182°;

$\lambda_{max.}^{KBr}$ 5.76 and 6.06$\mu$; $\lambda_{max.}^{EtOH}$ 247 m$\mu$ ($\epsilon$ 17,300)

Example 17.—($\pm$)-17$\beta$-hydroxy-3-methoxy-13-methyl-8-isogona-1,3,5(10)-trien-11-one Dissolve ($\pm$) - 17$\beta$-hydroxy-3-methoxy-13-methylgona-1,3,5(10),8-tetraen-11-one (8.00 g.) in tetrahydrofuran (150 ml.) and dilute with ethanol (350 ml.), then add the solution to a pre-hydrogenated mixture of 5% palladium on carbon (4.0 g.) and ethanol (50 ml.). Treat with hydrogen at one atmosphere until uptake of the gas ceases. Filter the mixture through Super Cel and remove the solvents in vacuo. Dissolve the residue in methylene chloride, treat with Nuchar charcoal and filter through Super Cel. Remove the solvent in vacuo and dissolve the resulting solid in boiling ethanol. Allow the solution to cool to room temperature and filter to obtain 4.32 g. of the title product as the ethanol solvate. The shiny hexagonal plates have M.P. 140–142° with evolution of gas. Dry the sample at 60° C. under vacuum to obtain a partial solvate of the title product, M.P. 175–177°;

$\lambda_{max.}^{KBr}$ 3.0 (EtOH) and 5.85$\mu$

Calc'd for $C_{19}H_{24}O_3 \cdot 1/3\ C_2H_5OH$: C, 74.81; H, 8.30%. Found: C, 74.72; H, 8.21%.

Example 18.—($\pm$)-3-methoxy-13-methyl-8-isogona-1,3,5(10)-triene-11,17-dione

Dissolve ($\pm$) - 3 - methoxy-13-methylgona-1,3,5(10),8-tetraene-11,17-dione (3.00 g.) in tetrahydrofuran (100 ml.) and dilute the solution with ethanol (100 ml.), then add the solution to a pre-hydrogenated mixture of 5% palladium on carbon (1.5 g.) and ethanol (50 ml.). Treat the solution with hydrogen at one atmosphere until uptake of the gas is complete. Filter through Super Cel and remove the solvents in vacuo. Dissolve the residue in methylene chloride and treat with Nuchar charcoal. Filter through Super Cel and remove the methylene chloride in vacuo. Triturate the residue with methanol and filter to obtain 2.31 g. of the title product as a white crystalline solid; M.P. 178–182°;

$\lambda_{max.}^{KBr}$ 5.80 and 5.85$\mu$

Further purify a sample (1.71 g.) by treating a methylene chloride solution with Nuchar charcoal, filtering through Super Cel and replacing the methylene chloride with ethanol by boiling in the steam bath. Allow to stand to deposit 1.40 g. of the pure title product; M.P. 185–188°;

$\lambda_{max.}^{KBr}$ 5.79 and 5.83$\mu$

Calc'd for $C_{19}H_{22}O_3$: C, 76.48; H, 7.43%. Found: C, 76.28; H, 7.68%.

Example 19.—($\pm$)-3-methoxy-13-methyl-8-isogona-1,3,5(10)-triene-11,17$\beta$-diol To a stirred mixture of ($\pm$)-17$\beta$-hydroxy-3-methoxy-13-methyl-8-isogona-1,3,5(10)-trien-11-one (3.50 g.) and methanol (75 ml.) add sodium borohydride (a total of 3.0 g.) in small portions over one-half hour. After complete addition, stir for one hour more, then cool the solution (ice-bath) and add water dropwise (200 ml.). Filter and air-dry the resulting white crystalline precipitate. Dry the solid over $P_2O_5$ (vac.) to obtain 3.10 g. of the title product; M.P. 153–155°. Further purify a sample by treating a solution of the above solid in methylene chloride with Nuchar charcoal, filter through Super Cel and remove the solvent in vacuo. Dissolve the resulting oil in ether and let stand to deposit the pure title product as colorless, granular prisms; M.P. 155–157°;

$\lambda_{max.}^{KBr}$ 2.84 and 2.97$\mu$

Example 20.—($\pm$)-3-methoxy-13-methyl-8-isogona-1,3,5(10)-triene-11,17$\beta$-diol To a stirred mixture of ($\pm$)-3-methoxy-13-methyl-8-isogona-1,3,5(10)-triene-11,17-dione (0.50 g.) and methanol (50 ml.) add sodium borohydride (a total of 1.0 g.) in small portions over a period of 1.5 hours. After complete addition, stir for one hour more, then add water (150 ml.) dropwise to obtain a white crystalline precipitate. Filter and air-dry the solid (0.37 g.; M.P. 147–150°). Dissolve the solid in tetrahydrofuran, treat with Nuchar charcoal and filter through Super Cel. Remove the solvent in vacuo, dissolve the resulting oil in ether and stand to let

Example 30.—(±)-3-methoxy-13-ethyl-8-isogona-2,5(10)-triene-11,17β-diol

Dissolve (±)-3-methoxy-13-ethyl-8-isogona-1,3,5(10)-triene-11,17β-diol (2.0 g.) in dry tetrahydrofuran (50 ml.) and add to liquid ammonia (750 ml.) containing tetrahydrofuran (300 ml.). Add lithium metal ribbon (0.400 g.), stir for one half hour and discharge the blue color by dropwise addition of ethanol. Add water, extract with ether and wash, dry and evaporate the organic layer to provide the title compound.

Example 31.—(±)-11,17β-dihydroxy-13-ethyl-8-isogon-5(10)-en-3-one

Add (±)-3-methoxy-13-ethyl-8-isogona-2,5(10)-diene-11,17β-diol (1.2 g.) to methanol (60 ml.) containing oxalic acid monohydrate (0.45 g.) in water (5 ml.). Stir under nitrogen for three hours, pour into water, extract with methylene chloride, and wash, dry and evaporate the organic layer to provide the title compound.

Example 32.—(±)-11,17β-dihydroxy-13-methyl-8-isogon-4-en-3-one

Dissolve (±)-13-methyl-3-methoxy-8-isogona-2,5(10)-diene-11,17β-diol (0.100 g.) in methanol (45 ml.) and add concentrated hydrochloric acid (3 ml.) and water (2 ml.). Stir under nitrogen for 1 hour, pour into water and extract with ether. Wash, dry and evaporate to obtain the crude title product as a gum, $\lambda^{film}_{max.}$ 3.0, 6.0μ; $\lambda^{EtOH}_{max.}$ 245 mμ

The subject matter which applicants regard as their invention is particularly pointed out and distinctly claimed as follows:

1. A compound having the structure

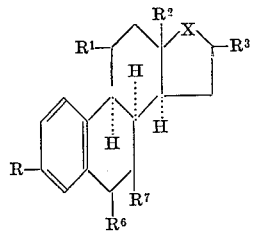

wherein

R is alkoxy, hydroxy, or carboxylic acyloxy;
$R^1$ is oxo or hydroxy;
$R^2$ is polycarbon alkyl;
$R^3$ is a hydrogen or hydroxy; and
X is

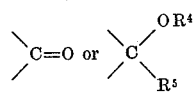

wherein $R^4$ is hydrogen or carboxylic acyl,
$R^5$ is hydrogen, alkyl, alkenyl, or alkynyl, or $R^4$ and $R^5$ taken together are —CH₂—CH₂—O—;
and $R^6$ and $R^7$ are hydrogen or lower alkyl.

2. A compound having the structure

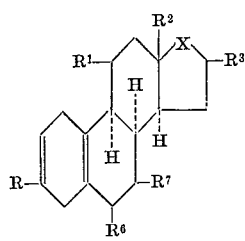

wherein

R is alkoxy, hydroxy, or carboxylic acyloxy;
$R^1$ is oxo or hydroxy;
$R^2$ is alkyl;
$R^3$ is hydrogen or hydroxy; and
X is

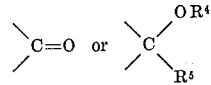

wherein $R^4$ is hydrogen or carboxylic acyl, $R^5$ is hydrogen, alkyl, alkenyl, or alkynyl, or $R^4$ and $R^5$ taken together are —CH₂—CH₂—O—;
and $R^6$ and $R^7$ are hydrogen or lower alkyl.

3. A compound having the structure

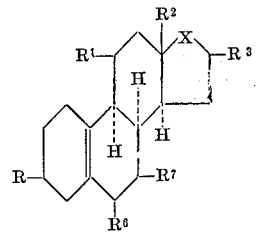

wherein

R is oxo, hydroxy, or carboxylic acyloxy;
$R^1$ is oxo or hydroxy;
$R^2$ is alkyl;
$R^3$ is hydrogen or hydroxy; and
X is

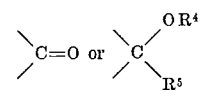

wherein $R^4$ is hydrogen or carboxylic acyl, $R^5$ is hydrogen, alkyl, alkenyl, or alkynyl, or $R^4$ and $R^5$ taken together are —CH₂—CH₂—O—; and
$R^6$ and $R^7$ are hydrogen or lower alkyl.

4. A compound having the structure

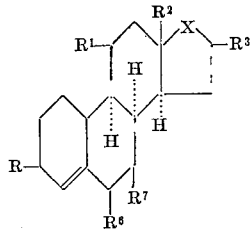

wherein

R is oxo, hydroxy, or carboxylic acyloxy;
$R^1$ is oxo or hydroxy;
$R^2$ is alkyl;
$R^3$ is hydrogen or hydroxy; and
X is

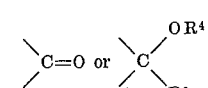

wherein $R^4$ is hydrogen or carboxylic acyl, $R^5$ is hydrogen, alkyl, alkenyl, or alkynyl, or $R^4$ and $R^5$ taken together are —CH₂—CH₂—O—; and
$R^6$ and $R^7$ are hydrogen or lower alkyl.

5. The process for preparing an 8-isogona-1,3,5(10)-trien-11-one in which the 3-position bears no substituent which is ring-deactivating in electrophilic aromatic substitution comprising:
  (a) treating a 13-alkylgona-1,3,5(10),8-tetraene or a 13-alkylgona-1,3,5(10),9(11)-tetraen-8-ol, wherein the 3-position bears no substituent which is ring-deactivating in electrophilic aromatic substitution with an organic peracid to form the corresponding 9,11-epoxy-13-alkylgona-1,3,5(10)-tetraen-8-ol,
  (b) treating with acid to form a gona-1,3,5(10),8-tetraen-11-one, and
  (c) catalytically hydrogenating the 8(9)-double bond to form an 8-isogona-1,3,5(10)-trien-11-one.

6. The process for preparing an 8-isogona-1,3,5(10)-trien-11-ol in which the 3-position bears no substituent which is ring-deactivating in electrophilic aromatic substitution comprising:
  (a) treating a 13-alkylgona-1,3,5(10),8-tetraene or a 13-alkylgona-1,3,5(10),9(11)-tetraen-8-ol, wherein the 3-position bears no substituent which is ring-deactivating in electrophilic aromatic substitution, with an organic peracid to form the corresponding 9,11-epoxy-13-alkylgona-1,3,5(10)-tetraen-8-ol,
  (b) treating with acid to form a gona-1,3,5(10),8-tetraen-11-one, and
  (c) reducing the 11-ketone function with an alkali metal hydride to form a gona-1,3,5(10),8-tetraen-11-ol, and
  (d) catalytically hydrogenating the 8(9)-double bond to form an 8-isogona-1,3,5(10)-trien-11-ol.

7. The compound according to claim 1, 17-hydroxy-3-methoxy-13-ethyl-8-isogona-1,3,5(10)-trien-11-one.

8. The compound according to claim 1, 3-methoxy-13-ethyl-8-isogona-1,3,5(10)-triene-11,17-dione.

9. The compound according to claim 1, 3-methoxy-13-ethyl-8-isogona-1,3,5(10)-triene-11,17-diol.

10. The compound according to claim 2, 3-methoxy-13-methyl-8-isogona-2,5(10)-diene-11,17-diol.

11. The compound according to claim 2, 3-methoxy-13 - methyl - 8 - isogona - 2,5(10) - diene - 11,17 - diol, 17-acetate.

12. The compound according to claim 2, 3-methoxy-13-ethyl-8-isogona-2,5(10)-diene-11,17-diol.

13. The compound according to claim 3, 11,17-dihydroxy-13-methyl-8-isogon-5(10)-en-3-one.

14. The compound according to claim 3, 11,17-dihydroxy-13-ethyl-8-isogon-5(10)-en-3-one.

15. The compound according to claim 3, 11,17-dihydroxy - 13 - methyl - 8 - isogon - 5(10) - en - 3 - one, 17-acetate.

16. The compound according to claim 4, 11,17-dihydroxy-13-methyl-8-isogon-4-en-3-one.

17. The process for preparing an 8-isogona-1,3,5(10)-trien-11-one, which comprises catalytically hydrogenating the 8-(9)-double bond of a gona-1,3,5(10),8-tetraen-11-one.

References Cited
UNITED STATES PATENTS

| | | | |
|---|---|---|---|
| 3,202,686 | 8/1965 | Hughes et al. | 260—397.45 |
| 3,346,602 | 10/1967 | Baran | 260—397.45 |
| 3,365,473 | 1/1968 | Taub | 260—397.3 |

ELBERT L. ROBERTS, Primary Examiner

U.S. Cl. X.R.

260—239.55, 397.5, 999